United States Patent [19]

Kawabata

[11] 3,972,472

[45] Aug. 3, 1976

[54] THERMOSTATICALLY RESPONSIVE VALVE

[75] Inventor: Yasuhiro Kawabata, Toyoto, Japan

[73] Assignee: Aisin Seiki Kabushiki Kaisha, Kariya, Japan

[22] Filed: Oct. 11, 1974

[21] Appl. No.: 514,082

[30] Foreign Application Priority Data
Oct. 12, 1973 Japan............................. 48-114985

[52] U.S. Cl.............................. 236/87; 123/117 A; 123/119 A; 137/595; 236/101 A
[51] Int. Cl.²......................................... G05D 23/02
[58] Field of Search..................... 123/117 A, 119 A; 236/86, 87, 101 A; 137/595, 625.27, 625.50

[56] References Cited
UNITED STATES PATENTS

| | | |
|---|---|---|
| 2,009,102 | 7/1935 | Bern ............................... 137/595 X |
| 2,868,459 | 1/1959 | Modes ................................ 236/87 |
| 3,319,888 | 5/1967 | Creager ............................... 236/87 |
| 3,383,041 | 5/1968 | Stratynski ........................ 236/87 X |
| 3,460,754 | 8/1969 | Templin et al..................... 236/87 X |
| 3,770,195 | 11/1973 | Franz.............................. 236/87 X |
| 3,783,847 | 1/1974 | Kolody............................ 123/119 A |
| R26,840 | 3/1970 | Harvey................................ 236/86 |

Primary Examiner—William F. O'Dea
Assistant Examiner—Ronald C. Capossela
Attorney, Agent, or Firm—Berman, Aisenberg & Platt

[57] ABSTRACT

A thermostatically responsive valve is provided which comprises a thermal element assembled with a housing to sense the ambient temperature, a plurality of responsive valves arranged around the power member of the thermal element within an interior of the housing to control the vacuum applied to pneumatically operated devices, and a spring-loaded movable member separably engaged with the power member within the interior of the housing to operate the responsive valves in response to the movement of the power member.

6 Claims, 1 Drawing Figure

U.S. Patent   Aug. 3, 1976   3,972,472
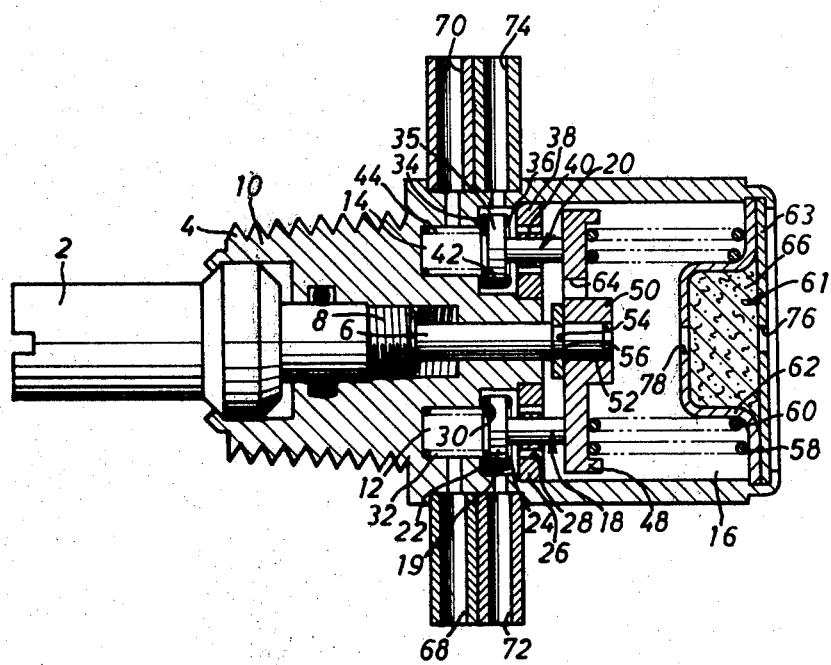

THERMOSTATICALLY RESPONSIVE VALVE

BACKGROUND OF THE INVENTION

The present invention relates to a thermostatically responsive valve for pneumatically operated devices and more particularly to an improvement of a thermostatically responsive valve for a pneumatically operated device to be controlled in response to the ambient temperature such as the operating temperature of an internal combustion engine.

SUMMARY OF THE INVENTION

The main object of the present invention is to provide a thermostatically responsive valve wherein hysteresis caused by mechanical resistance may not be given to the power member of a thermal element to sense the ambient temperature.

Another object of the present invention is to provide a thermostatically responsive valve wherein the power member of the thermal element is arranged only to act on a return spring assembled within the valve to minimize the mechanical resistance.

A further object of the present invention is to provide a thermostatically responsive valve wherein a plurality of responsive valves may be arranged around the power member of the thermal element for high operational accuracy and compactness in size.

According to the present invention briefly summarized, disclosed herein is a thermostatically responsive valve which comprises a housing provided at one side thereof with an air chamber including a first port to be connected with a pneumatically operated device and a vacuum chamber opening to the air chamber and including a second port to be connected with a source of vacuum; a thermal element assembled with the housing at the opposite side of the air chamber to sense the ambient temperature and having a power member extending therefrom through the housing body into the air chamber; a movable member separably mounted on the extended portion of the power member within the air chamber to be actuated by the power member; resilient means assembled with the movable member to return the movable member to its original position; and responsive valve means interposed between the vacuum chamber and the air chamber and separably engaged with the movable member to normally close the vacuum chamber due to the biasing force of the resilient means and to open the vacuum chamber by itself in response to the actuation of the movable member to connect the first port with the second port.

BRIEF DESCRIPTION OF THE DRAWING

The above mentioned and further objects and features of the present invention will become clearer from the following description in reference with the accompanying drawing, which depicts a preferred embodiment of a thermostatically responsive valve in accordance with the present invention.

DESCRIPTION OF THE PREFERRED EMBODIMENT

Referring now to the drawing, a thermostatically responsive valve in accordance with the present invention comprises a thermal element 2 assembled with a housing 10, a disc plate or movable member 48 to be actuated by a power member 6 of the thermal element 2 and a first and a second responsive valves 18 and 20 to be operated in response to the movement of the disc plate 48. The thermal element 2 contains therein such thermally expansible material as to change its volume responsive to the ambient temperature changes and includes the power member 6 extended therefrom. The power member 6 extends through the housing body into an air chamber 16 formed within the housing 10 to be axially displaceable responsive to the volume changes of the thermally expansible material. The extended portion of the power member 6 is provided with an annular groove 54 to receive therein a snap ring 56. The assembling position of the power member 6 to the thermal element 2 is controlled by an adjusting screw 8 to adjust the operating temperature for this thermostatically responsive valve. The thermal element 2 is in contact with a cylinder head of an internal combustion engine to sense the operating temperature of the engine.

The housing 10 is provided therein with a first and a second cylindrical vacuum chambers 12 and 14 symmetrically arranged around the power member 6. The air chamber 16 is formed at the right side of the vacuum chambers 12 and 14 and closed at its right end with an air filter assembly 61 which comprises an inside cover 62, an outside cover 63 and a filter element 66 contained between the two covers 62 and 63. The two covers 62 and 63 are provided respectively with air holes 78 and 76 substantially at radial center thereof. The housing 10 is further provided thereon with a first and a second outlet ports 68 and 70 opening respectively to the first and second vacuum chambers 12 and 14. These first and second outlet ports 68 and 70 are connected respectively to an intake manifold (not shown) of the engine. A first and a second vacuum output connections 72 and 74 are also provided on the housing 10 respectively adjacent to the first and second outlet ports 68 and 70. The first output connection 72 is connected to a pneumatically operated device to cause recirculation of exhaust gas into the intake manifold when the coolant of the engine reaches the operating temperature of the engine. The second output connection 74 is connected to an automatic spark advancer to supply the necessary vacuum to operate the spark advancer to advance the spark of the engine when the coolant of the engine reaches the operating temperature of the engine. These output connections 72 and 74 are also selectively communicated with the vacuum chambers 12 and 14 respectively in response to the operation of the first and second responsive valves 18 and 20.

The first responsive valve 18 is interposed between the first vacuum chamber 12 and the air chamber 16 to selectively connect the first output connection 72 with the air chamber 16 and the first vacuum chamber 12. This first responsive valve 18 comprises a disc-shaped valve seat 26 having through holes 28 thereon and a valve body 19 slidably engaged with a central aperture of the valve seat 26. The valve body 19 includes annular seals 24 and 22 facing respectively to the seat 26 and a valve seat 30 provided at the opening shoulder portion of the vacuum chamber 12. The valve body 19 is normally biased rightward by a coil spring 32 disposed between the inner wall of the first vacuum chamber 12 and the head of the valve body 19 and separably engaged at its stem with the disc plate 48.

The second responsive valve 20 is interposed between the second vacuum chamber 14 and the air chamber 16 to selectively connect the second output connection 74 with the air chamber 16 and the second vacuum chamber 14. This second responsive valve 20 comprises a disc-shaped valve seat 38 having through holes 40 thereon and a valve body 35 slidably engaged with a central aperture of the valve seat 38. The valve body 35 is provided with annular seals 36 and 34 facing respectively to the seat 38 and a valve seat 42 provided at the opening shoulder portion of the vacuum chamber 14. The valve body 35 is normally biased rightward by a coil spring 44 interposed between the inner wall of the second chamber 14 and the head of the valve body 35 and separably engaged at its stem with the disc plate 48.

The disc plate 48 is normally biased leftward within the air chamber 16 by coiled springs 58 and 60 disposed between the disc plate 48 and the inside cover 62 of the air filter assembly 61. The total resilient force of the springs 58 and 60 is predetermined to be larger than the total resilient force of the valve springs 32 and 44. Thus, the left face of the disc plate 48 normally engages with the stems of the valve bodies 19 and 35 of the first and second responsive valves 18 and 20. This disc plate 48 includes a guide portion 50 at the center thereof and a through hole 64. The guide portion 50 is provided with a cylindrical bore 52 to receive therein slidably the extended portion of the power member 6 of the thermal element 2. Thus, the rightward movement of the power member 6 is given only to the disc plate 48 and the leftward movement of the disc plate 48 is given by the resilient force of the coil springs 58 and 60 against the resilient force of the springs 32 and 44.

In operation of the thermostatically responsive valve, when the engine has come up to its predetermined operating temperature, the power member 6 of the thermal element 2 extends responsive to the expansion of the thermally expansible material within the thermal element 2 to displace the disc plate 48 rightwardly by way of the snap ring 56 against the urging force of the springs 58 and 60. This frees the valve springs 32 and 44 within the first and second vacuum chambers 12 and 14, thereby to separate the valve bodies 19 and 35 from the valve seats 30 and 42. Consequently, the first and second vacuum output connections 72 and 74 are connected respectively with the first and second vacuum outlet ports 68 and 70 through the first and second vacuum chambers 12 and 14 and the seals 24 and 36 of the valve bodies 19 and 35 are seated on the valve seats 26 and 38 respectively. This means the switch-over of the connection of the first and second vacuum output connections 72 and 74 to the vacuum supply from the air supply to operate the pneumatically operated device and the spark advancer.

When the engine temperature further increases, the power member 6 of the thermal element 2 extends to further move the disc plate 48 rightwardly against the urging force of the springs 58 and 60. This separates the disc plate 48 from the stems of the valve bodies 19 and 35. Under this condition, the first and second responsive valves 18 and 20 maintain the switched-over positions thereof by way of the resilient forces of the valve springs 32 and 44.

When the engine temperature decreases, the springs 58 and 60 will return the power member 6 of the thermal element 2 to its initial position by way of the disc plate 48 and the snap ring 56. Then, the disc plate 48 engages with the stems of the valve bodies 19 and 35 which are returned to their original positions to close the first and second vacuum chambers 12 and 14. Consequently, the two vacuum output connections 72 and 74 are communicated with the atmospheric air by way of the through holes 28, 38, the holes 78, the filter element 66 and the hole 76 as shown in the figure.

When the engine temperature further decreases, the power member 6 of the thermal element 2 shrinks within the sliding bore 52 of the disc plate 48, the disc plate 48 and the first and second valves 18 and 20 remaining in their returned positions as shown in the figure by way of the resilient forces of the springs 58 and 60.

Having thus described the preferred embodiment of the invention it should be understood that numerous structural modifications and adaptation may be resorted to without departing from the spirit of the invention.

What is claimed is:

1. A thermostatically responsive valve comprising: a housing provided at one end with an air chamber including an air inlet port, a vacuum chamber in said housing separated from said air chamber and including a vacuum inlet port to be connected with a source of vacuum; and an outlet chamber including an outlet port provided in said housing between said air and vacuum chambers;

a thermal element expansible in response to change of ambient temperature assembled with said housing at the end opposite said air chamber, said thermal element having a power member extending through said housing into said air chamber only and being completely spaced from contact with the vacuum and outlet chambers;

a movable member separably mounted on the extended portion of said power member within said air chamber to be moved by said thermal element in one direction;

a return spring within said air chamber engaging said movable member and biasing the member so as to return it in the opposite direction;

a valve means disposed within said outlet chamber and separably engaged with said movable member to normally close the communication between said vacuum and outlet chambers and open the communication between said air and outlet chambers due to the biasing force of said return spring; and a valve spring disposed within the vacuum chamber biasing said valve means in the direction opposite to the biasing direction of said return spring, the biasing force of said valve spring being smaller than that of said return spring;

whereby upon movement of said movable member against the biasing force of said return spring in response to expansion of said thermal element, said valve means is freed from the biasing force of said return spring so that said valve means is biased only by said valve spring to open the communication between said vacuum and outlet chambers and to close the communication between said air and outlet chambers.

2. A thermostatically responsive valve as claimed in claim 1, wherein said air, outlet and inlet chambers are separated from one another by rigid walls, said valve means including a stem slideably passing through an opening in the wall separating the air and outlet chambers and separably engaging said movable member in the air chamber.

3. A thermostatically responsive valve as claimed in claim 1, wherein said vacuum chamber is disposed at one side of said power member of said thermal element and said vacuum inlet port and said outlet port are provided on said housing adjacent to one another.

4. A thermostatically responsive valve as claimed in claim 2, wherein said housing includes an air filter assembly covering the air inlet port to said air chamber and said return spring is a coil spring interposed between said movable member and the inner wall of said air filter assembly to normally close said vacuum chamber by operating said valve means.

5. A thermostatically responsive valve as claimed in claim 2, wherein said valve means comprises a valve body on said stem which normally closes said vacuum chamber by biasing force of the return spring against said movable member and said stem, at least one through hole communicating said outlet chamber with said air chamber in the wall separating these respective chambers, a valve seat provided between said air chamber and said outlet chamber surrounding the through holes, said valve body being biased by said valve spring toward said valve seat against the biasing force of said return spring to connect said outlet chamber with said vacuum chamber and disconnect said air and outlet chambers when said movable member is actuated by said power member of the thermal element.

6. A thermostatically responsive valve comprising:
- a housing provided at one end with an air chamber including an air inlet port, a plurality of vacuum chambers each including a vacuum inlet port and a plurality of outlet chambers each including an outlet port provided in said housing between said air chamber and said vacuum chambers respectively;
- a thermal element expansible in response to change of ambient temperature assembled with said housing at the end opposite said air chamber, said thermal element having a power member extending through said housing into said air chamber only and being completely spaced from contact with said vacuum chambers and said outlet chambers which are arranged around said power member;
- a movable member separably mounted on the extended portion of said power member within said air chamber to be moved by said thermal element in one direction;
- a return spring within said air chamber engaging the movable member to return it in the opposite direction;
- a plurality of valve means disposed within said outlet chambers respectively and separably engaged with said movable member to normally close the communication between said respective vacuum chambers and said respective outlet chambers to normally open the communication between said air chamber and said respective outlet chambers due to the biasing force of said return spring; and
- a plurality of valve springs disposed within said respective vacuum chambers for biasing said respective valve means in the direction opposite to the biasing direction of said return spring, the total biasing force of said valve springs being smaller than that of said return spring;

whereby upon movement of said movable member against the biasing force of said return spring in response to expansion of said thermal element, said respective valve means are freed from the biasing force of said return spring so that said respective valve means are biased only by said respective valve springs to open the communication between said respective vacuum chambers and said respective outlet chambers and to close the communication between said air and respective outlet chambers.

* * * * *